(12) United States Patent
Robinson et al.

(10) Patent No.: US 6,886,590 B2
(45) Date of Patent: May 3, 2005

(54) SEAL ASSEMBLY FOR FUEL PRESSURE REGULATOR

(75) Inventors: Barry S. Robinson, Williamsburg, VA (US); James A. Wynn, Jr., Virginia Beach, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 197 days.

(21) Appl. No.: 10/247,614

(22) Filed: Sep. 20, 2002

(65) Prior Publication Data

US 2004/0055646 A1 Mar. 25, 2004

(51) Int. Cl.⁷ .......................... F16K 27/00; G05D 16/00
(52) U.S. Cl. ..................... 137/454.2; 123/459; 137/510
(58) Field of Search ............................. 137/510, 454.2; 123/459, 463

(56) References Cited

U.S. PATENT DOCUMENTS

| | | | |
|---|---|---|---|
| 4,741,360 A | * 5/1988 | Affeldt et al. .............. | 137/510 |
| 5,458,104 A | 10/1995 | Tuckey | |
| 5,785,080 A | 7/1998 | Herbst | |
| 5,967,120 A | * 10/1999 | Blanton et al. ............. | 137/510 |
| 6,016,831 A | 1/2000 | Bueser et al. | |
| 6,161,574 A | 12/2000 | Gerhard et al. | |

* cited by examiner

Primary Examiner—Stephen M. Hepperle

(57) ABSTRACT

A pressure regulation assembly of a fuel supply includes a receptacle, an inlet connectable to the fuel supply and in fluid communication with the receptacle, an outlet in fluid communication with the receptacle, and a pressure regulator mounted in the receptacle to selectively open fluid communication between the inlet and the outlet. The receptacle includes a first surface surrounding an axis, and a second surface surrounding the axis and the first surface to provide a void between the first surface and the second surface. The pressure regulator extends into the void between the first surface of the receptacle and the second surface of the receptacle and includes a third surface surrounding the axis and a fourth surface surrounding the axis and the third surface. A first seal engages the first surface of the receptacle and the third surface of the pressure regulator. A second seal engages the second surface of the receptacle and the fourth surface of the pressure regulator.

The pressure regulator can include a first housing member, a second housing member connected to the first housing member, and a closing member movably contained within the first housing member and the second housing member. The second housing member includes a continuous wall having a base, a recess in the base, an opening in the recess, and a seat adjacent the opening and surrounding the opening. The closing member is selectively engageable with the seat to fluidly seal the opening. The recess has a first surface surrounding an axis and an inner sealing portion on the first surface. The wall also includes a second surface surrounding the axis and the first surface and having an outer sealing portion.

22 Claims, 2 Drawing Sheets

SEAL ASSEMBLY FOR FUEL PRESSURE REGULATOR

BACKGROUND OF THE INVENTION

It is believed that fuel pressure regulators relieve over-pressures in the fuel supply line extending between the fuel tank and the internal combustion engine. This fuel pressure regulation maintains the fuel pressure supplied to the fuel injectors at or below a prescribed value.

It is believed that over-pressures in the fuel supply line are caused by at least two sources. The first source includes fuel pressure pulses generated by the fuel pump sending pressurized fuel from the fuel tank to the fuel injectors. The second source includes unintended restrictions in the fuel supply line such as crimps or debris blockages.

SUMMARY OF THE INVENTION

There is provided a pressure regulation assembly of a fuel supply includes a receptacle, an inlet connectable to the fuel supply and in fluid communication with the receptacle, an outlet in fluid communication with the receptacle, and a pressure regulator mounted in the receptacle to selectively open fluid communication between the inlet and the outlet. The receptacle includes a first surface surrounding an axis, and a second surface surrounding the axis and the first surface to provide a void between the first surface and the second surface. The pressure regulator extends into the void between the first surface of the receptacle and the second surface of the receptacle and includes a third surface surrounding the axis and a fourth surface surrounding the axis and the third surface. A first seal engages the first surface of the receptacle and the third surface of the pressure regulator. A second seal engages the second surface of the receptacle and the fourth surface of the pressure regulator.

There is also provided a pressure regulator including a first housing member, a second housing member connected to the first housing member, and a closing member movably contained within the first housing member and the second housing member. The second housing member includes a continuous wall having a base, a recess in the base, an opening in the recess, and a seat adjacent the opening and surrounding the opening. The closing member is selectively engageable with the seat to fluidly seal the opening. The recess has a first surface surrounding an axis and an inner sealing portion on the first surface. The wall also includes a second surface surrounding the axis and the first surface and having an outer sealing portion.

There is yet also provided a fuel pressure regulator including an upper housing, a stamped metal lower housing connected to the upper housing, a diaphragm assembly movably connected between the upper housing and the lower housing, and a body connected to the diaphragm assembly. The lower housing and the upper housing provide a pressure chamber therebetween. The diaphragm divides the pressure chamber into two chamber portions. The stamped metal lower housing includes a base wall portion and a side wall portion surrounding the base wall portion and contiguous with the base wall portion. The base wall portion has an opening and a seat adjacent the opening. The body is movable with the diaphragm assembly to selectively engage the seat to prevent fluid flowing through the opening.

There is also yet provided a modular fuel pressure regulation assembly including a receptacle and a fuel pressure regulator. The receptacle includes an inlet in fluid communication with the receptacle and an outlet in fluid communication with the receptacle and configured to minimize noise as fuel passes through the outlet. The fuel pressure regulator is sealingly mounted within the receptacle intermediate the inlet and the outlet to selectively open and close fluid communication between the inlet and the outlet. The fuel pressure regulator includes an upper housing and a stamped metal lower housing connected to the upper housing. The stamped metal lower housing has a base and side wall portion continuous with the base and surrounding the base. The base has an orifice and a seat surrounding the orifice.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
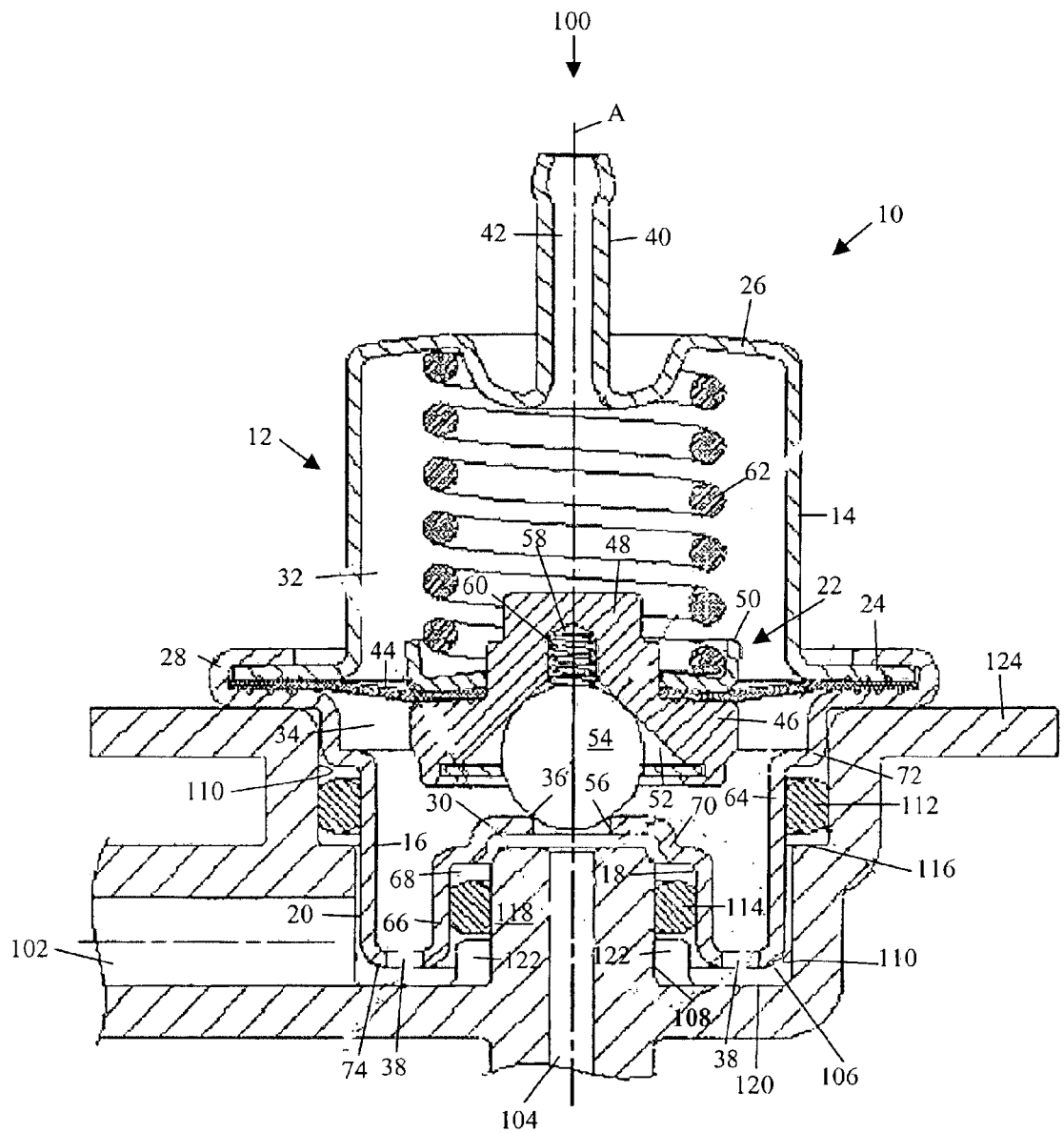
FIG. 1 is a cross-sectional view of a fuel pressure regulation assembly according to a first embodiment of the invention and showing the valve closing member in the closed position.

Referring to FIG. 1, a fuel pressure regulation assembly 100 includes a regulator inlet 102, a regulator outlet 104, a receptacle 106, and a fuel pressure regulator 10. The receptacle 106 is positioned between and in fluid communication with the regulator inlet 102 and the regulator outlet 104. The pressure regulator 10 is mounted in the receptacle 106 and normally blocks fluid communication between the regulator inlet 102 and the regulator outlet 104. As will be explained in detail below, the pressure regulation assembly 100 is configured to reduce noise and improve pressure regulation performance. A simplified and compact sealing arrangement prevents undesired fuel leakage between the receptacle 106 and the pressure regulator 10, as will be explained in detail below.

The receptacle 106 includes a central axis A, an first surface 108, and an second surface 110 concentric with the first surface 108 about the central axis A. The first surface 108 faces away from the central axis A and the second surface 110 faces toward the central axis A. The second surface 110 is radially outward of and surrounds the first surface 108.

The fuel pressure regulator 10 is centered about the central axis A and includes a housing 12 having an upper housing 14 and a lower housing 16. The lower housing 14 is cylindrical and includes an third surface 18 and an fourth surface 20 concentric with the third surface 18 about the central axis A. The third surface 18 faces away from the central axis A and the fourth surface 20 faces toward the central axis A and the third surface 18 surrounds the fourth surface 20. The lower housing 16 extends between the second surface 110 of the receptacle 106 and the first surface 108 of the receptacle 106. The fourth surface 20 of the lower housing 16 is spaced from and opposes the second surface 110 of the receptacle 106. The third surface 18 of the lower housing 16 is spaced from and opposes the first surface 108 of the receptacle 106.

The fuel pressure regulator 10 is sealed in the receptacle 106 by an upper seal 112 and a lower seal 114. The upper seal 112 engages the second surface 110 of the receptacle 106 and the fourth surface 20 of the lower housing 16 and seals the space between these surfaces 20, 110. The lower seal 114 engages the first surface 108 of the receptacle 106 and the third surface 18 of the lower housing 16 and seals the space between these surfaces 18, 108. Preferably, the upper seal 112 and the lower seal 114 are O-rings.

Preferably, the second surface 110 of the receptacle 106 is cylindrical and centered about the central axis A. The second surface 110 of the receptacle 106 includes annular shelf 116 that provides a seat for the upper seal 112. Alternatively, the annular shelf ca be omitted and the second surface 110 of the receptacle 106 can have a constant diameter along the central axis A.

The receptacle 106 includes a projection 118 extending from the base 120 of the receptacle 106 toward the fuel pressure regulator 10. The first surface 108 of the receptacle 106 is located on the projection 118. Preferably, the projection 118 is cylindrical, centered on the central axis A, and extends approximately perpendicular to the regulator inlet 102. The regulator outlet 104 extends through the projection 118 along the central axis A. An opening in the projection 118 fluidly connects the regulator outlet 104 with the receptacle 106.

The receptacle 106 can include a plurality of blocks 122 formed at the base 120 of the receptacle 106 and adjacent to the projection 118 to provide a seat for the lower seal 114. The blocks 122 can be spaced about the circumference of the projection 118. Alternatively, a single ring can be provided at the base 120 of the receptacle 106 and adjacent to the projection 118 to provide the seat for the lower seal 114.

This seal assembly provides a compact arrangement as measured along the central axis A. Additionally, the retention of the upper seal 112 and the lower seal 114 does not require separate retaining rings to be mounted to the lower housing 16, thus minimizing the number of parts.

The pressure regulator 10 includes a diaphragm assembly 22 within the housing 12 that selectively places the regulator inlet 102 in fluid communication with the regulator outlet 104. The upper housing 14 is cylindrical, opened at one end, and includes a radial flange 24 at the opened end and a top 26 closing the other end. The lower housing 16 is opened at one end and includes a crimping flange 28 at the opened end and a base 30 at the other end. The opened ends of the upper housing 14 and the lower housing 16 are positioned adjacent each other and the diaphragm assembly 22 is crimped between the radial flange 24 and the crimping flange 28. The crimping flange 28 also extends around the radial flange 24 to secure the lower housing 16 to the upper housing 14. The diaphragm assembly 22 divides the interior of the housing 12 into a reference pressure chamber 32 and a fuel pressure chamber 34.

The base 30 of the lower housing 16 includes a valve seat 36 and a plurality of fuel inlets 38 spaced about the circumference of the base 30. The valve seat 36 is aligned with the opening in the projection 118 along the central axis A and spaced from the projection 118 along the central axis A when the fuel pressure regulator 10 is received in the receptacle 106. The fuel inlets 38 are in fluid communication with the fuel pressure chamber 34 and the receptacle 106. A reference pressure inlet 40 extends from the top 26 of the upper housing 14 and includes a cylindrical passage 42 in fluid communication with the reference pressure chamber 32.

The diaphragm assembly 22 includes a flexible annular diaphragm 44 having an third portion crimped between the radial flange 24 and the crimping flange 28 to secure the diaphragm assembly 22 to the housing 12. The inner portion of the diaphragm 44 is crimped between a radial flange 46 of a support member 48 and a retainer plate 50 to secure the diaphragm 44 to the support member 48.

The support member 48 includes a recess 52 that receives a valve closing member 54. Preferably, the valve closing member 54 is a sphere. The base 30 of the lower housing 16 includes an orifice 56 in fluid communication with the opening in the projection 118. Preferably, the orifice 56 is centered about the central axis A. The valve closing member 54 mates with the valve seat 36 to seal off the orifice 56 and thereby the regulator outlet 104. The support member 48 includes a bore 58 centered on the recess 52. The bore 58 contains a spring 60 that biasingly engages the valve closing member 54. The interaction of the valve closing member 54 with the recess 52 and the spring 60 ensures that the valve closing member 54 is properly aligned with the valve seat 36 to fluidly seal the regulator outlet 104 from the regulator inlet 102.

A spring 62 between the upper housing 14 and the diaphragm assembly 22 biases the diaphragm assembly 22 into sealing engagement with the valve seat 36 to block the flow of fuel from the fuel inlets 38 to the orifice 56, thus fluidly sealing the regulator outlet 104 from the regulator inlet 102. Fuel entering the fuel inlets 38 applies a pressure to diaphragm assembly 22. When the fuel pressure exceeds a threshold value, the diaphragm assembly 22 lifts off the valve seat 36, against the bias of the spring 62, to open the orifice 56, thus placing the regulator outlet 104 in fluid communication with the regulator inlet 102.

The spring 62 determines the over-pressure value at which of the fuel pressure regulator 10 operates. This permits a modular design for the regulator 10 in which the spring 62 is the only part of the fuel pressure regulator 10 that needs to be altered to meet different operating parameters. This preferred embodiment approach provides a family of fuel pressure regulators 10 having different pressure control values. The diaphragm 44 can be made from rubber or other elastic material sufficient to withstand the chemical effects of the fuel and provide the requisite elasticity, such as nitrile, fluorocarbon rubber and fluorosilicon rubber. This reduces manufacturing inventory, assembly complexity and cost.

The valve seat 36 is configured to match the shape of the valve closing member 54. Preferably, the valve seat 36 is integrally formed with the base 30 of the lower housing 16. The valve seat 36 can be coined onto the base 30 of the lower housing 16. This construction can permit the valve seat 36 to be provided simultaneously with the formation of the base 30 and then coined in a subsequent process. Thus, it is not necessary to form the valve seat as a separate member and then subsequently secure the valve seat to the lower housing 16. This promotes a minimum number of assembly steps and components for the manufacturing of the regulator 10.

Figure 2:
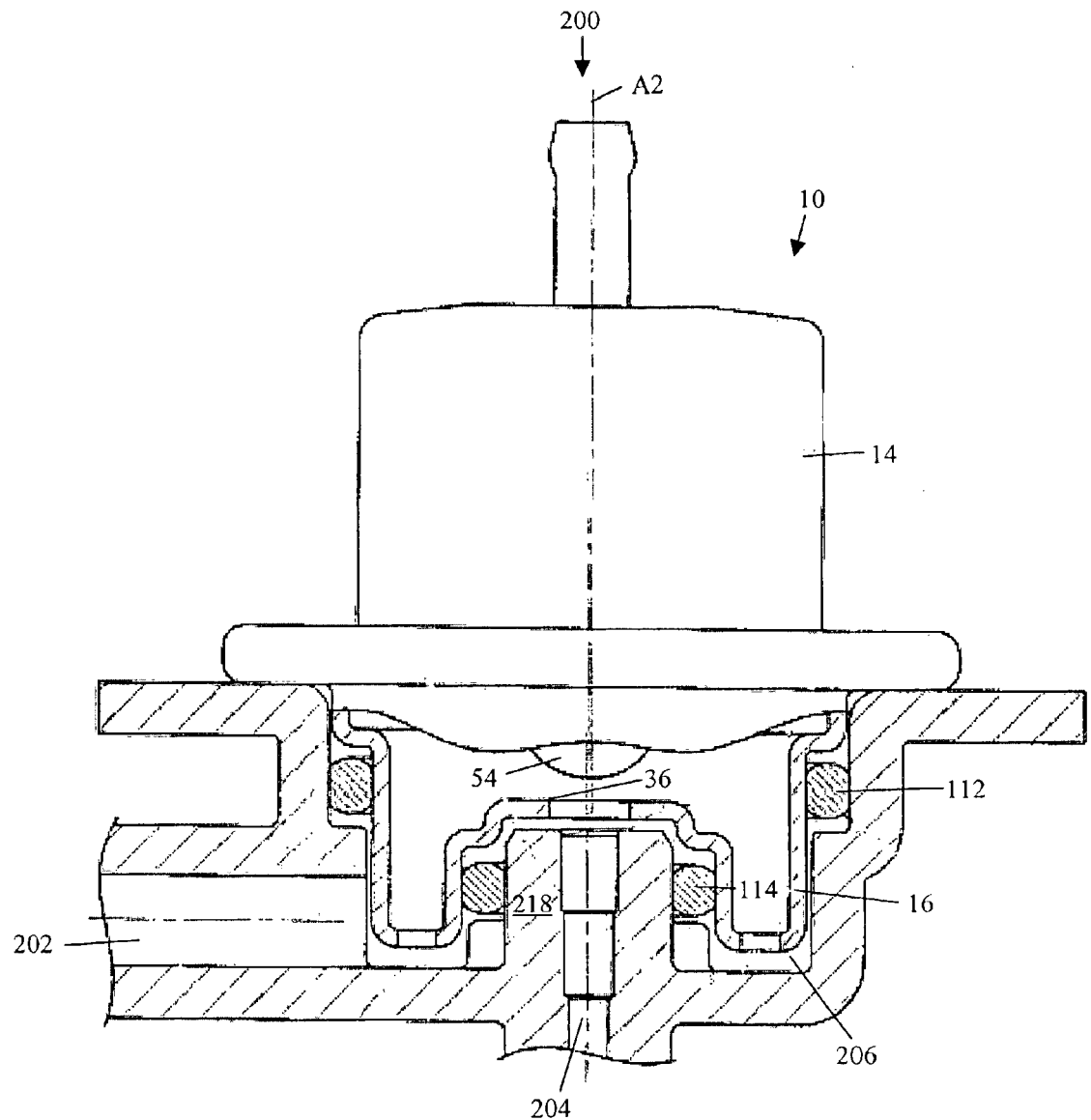
FIG. 2 is a cross-sectional view of a fuel pressure regulation assembly according to a second embodiment of the invention and showing the valve closing member in the opened position.

Fuel in the supply path (not shown) enters the regulator 10 through the regulator inlet 102 and applies a pressure against the diaphragm 44. When this applied pressure exceeds the threshold value, called over-pressure, the diaphragm 44 resiliently deflects toward the upper housing 14 to raise the valve closing member 54 off the valve seat 36 (as shown in FIG. 2). Fuel can then escape the supply path (not shown) through the regulator outlet 104, thus lowering the fuel pressure in the supply path (not shown) into the requisite operating pressure range. Thus, the pressure regulator 10 prevents over-pressurized fuel from reaching the outlet (not shown) of the supply path (not shown).

It is believed that, generally, the yield strength of the diaphragm 44 is exceeded only under rare over-pressure conditions. This is because the over-pressure in all but these rare over-pressures is sufficiently reduced below the yield strength of the diaphragm 44 when the valve closing member 54 opens the orifice 56 to permit excess fuel to escape the supply path (not shown) by way of the regulator outlet 104.

The lower housing 16 includes an outer cylindrical wall 64 extending between the base 30 and the crimping flange 28. The base 30 of the lower housing 16 includes an inner cylindrical wall 66 surrounding a recess 68 centered in the base 30. The projection 118 extends into the recess 68 when the pressure regulator 10 is mounted in the receptacle 106. The third surface 18 of the lower housing 16 is located on the cylindrical face of the inner cylindrical wall 66 forms a portion of the recess 68. The base 30 is configured to provide the recess 68 with a recess base having a depression and an annular step 70 surrounding the depression.

The lower seal 114 is captured between the annular step 70 and the plurality of blocks 122 when the pressure regulator 10 is mounted in the receptacle 106. By providing the annular step 70 on the base, there it is not necessary to place a additional retainer ring above the lower seal 114 to retain the lower seal 118 in the desired location between the lower housing 16 and the projection 118. Thus, the number of parts for the seal assembly can be reduced.

The outer cylindrical wall 64 of the lower housing 16 includes the fourth surface 20 of the lower housing 16 and an annular step 72 connecting the fourth surface 20 to the crimping flange 28. The upper seal 112 is captured between the annular step 72 and the annular shelf 116 when the pressure regulator 10 is mounted in the receptacle 106.

The base 30 of the lower housing 16 includes an end wall 74 connecting the outer cylindrical wall 64 and the inner cylindrical wall 66. Preferably, the end wall 74 extends radially relative to the central axis A. The fuel inlets 38 extend through and are circumferential spaced about the end wall 74.

The fuel pressure regulation assembly 100 further includes a support flange 124 surrounding the receptacle 106. The crimping flange 28 of the lower housing 16 contacts the support flange 124 when the fuel pressure regulator 10 is mounted in the receptacle 106. The length of the lower housing 16 measured along the central axis A is less then the depth of the receptacle 106 measured along the central axis A. The support flange 124 supports the housing 12 so that the annular face 74 of the lower housing 16 is spaced from the base 120 of the receptacle 106.

The lower housing 16 can be a stamped metal piece in which thecrimping flange 29, the base 30, the valve seat 36, and the outer cylindrical wall 64 are integrally formed on the lower housing 16 during the stamping process. In this stamped metal lower housing 16, the opening, the valve seat 36, the fuel inlets 38, the inner cylindrical wall 66, the recess 68, the annular step 70, and the end wall 74 are incorporated into the base 30 and the crimping flange 28 and the annular step 72 are incorporated into the outer cylindrical wall 64. By stamping the lower housing 16 from a single piece of sheet metal, the base 30 and the outer cylindrical wall 64 are incorporated into a continuous housing member to provide the lower housing 16. This can simplify the assembly process by manufacturing because these features can be formed simultaneously by a single stamping process. Further, this integral assembly can reduce the number of parts for assembling the fuel pressure regulator assembly 100.

Providing the regulator outlet 104 as a component of the receptacle 106 instead of the housing 12 permits integration of the regulator outlet 104 and the regulator inlet 102 with the receptacle 106. The regulator inlet 102, the regulator outlet 104, the receptacle 106, and the projection can be integrally formed by an injection molding process. This can reduce the cost and the number of parts for assembling the fuel pressure regulation assembly 100. The regulator outlet 104 can be integrally molded in a near net shape or a net shape so that minimal or no further machining will be required.

It is believed that the geometry of the regulator outlet 104 impacts the noise and the pressure regulation performance of the fuel pressure regulation assembly 100. Preferably, the regulator outlet 104 has geometry that reduces noise and improves pressure regulation. In the first embodiment of the fuel pressure regulator assembly 100 illustrated in FIG. 1, the regulator outlet 104 has a constant diameter along the central axis A to provide a straight passage through the extension. Alternatively, other configurations of the regulator outlet 104 are possible, such as that shown in FIG. 2.

FIG. 2 illustrates a second embodiment of a fuel pressure regulator assembly 200 that includes a regulator inlet 202, a regulator outlet 204, a receptacle 206, and a central axis A2. The fuel pressure regulator assembly 200 includes a fuel pressure regulator 10 and sealing arrangement as described above with reference to FIG. 1. The receptacle 206 is positioned between and in fluid communication with the regulator inlet 202 and the regulator outlet 204. The pressure regulator 10 is mounted in the receptacle 206 and normally blocks fluid communication between the regulator inlet 202 and the regulator outlet 204. The pressure regulation assembly 200 is configured to reduce noise and improve pressure regulation performance.

The receptacle 206 includes a projection 218 and the regulator outlet 204 extends through the projection 218. The regulator outlet 204 is tapered and preferably includes three sequentially decreasing stepped diameters. The stepped diameters decrease in size in the direction along the central axis A2 away from the lower housing 16 of the fuel pressure regulator 10. Alternatively, the bore of the regulator outlet 204 can have any number of stepped diameters greater than two. In a further alternate embodiment, the bore of the regulator outlet 204 can have a smooth taper along the central axis A2.

As with the first embodiment of FIG. 1, providing the regulator outlet 204 as a component of the receptacle 206 instead of the housing 12 permits integration of the regulator outlet 204 and the regulator inlet 202 with the receptacle 206. The regulator inlet 202, the regulator outlet 204, the receptacle 206, and the projection can be integrally formed by an injection molding process. This can reduce the cost and the number of parts for the fuel pressure regulation assembly 200. The regulator outlet 204 can be integrally molded in a near net shape or a net shape so that minimal or no further machining will be required.

In comparing the embodiments of the fuel pressure regulator assembly of FIGS. 1 and 2, it is apparent that integration of the regulator outlet 104, 204 with the receptacle 106, 206 permits a modular assembly where different noise suppression requirements can be met without modification to the fuel pressure regulator 10. Instead, the geometry of the regulator outlet 104, 204 can be configured to provide the requisite noise suppression. This provides for a modular approach to the fuel pressure regulator assembly 100, 200 where a common fuel pressure regulator 10 can be combined with various configurations of the regulator outlet 104, 204 to meet various noise suppression requirements. This also can reduce manufacturing overhead because the number of different fuel pressure regulators 10 can be minimized without compromising noise suppression capabilities.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A pressure regulation assembly of a fuel supply comprising:
    a receptacle including:
    an first surface surrounding an axis; and
    an second surface surrounding the axis and the first surface to provide a void between the first surface and the second surface;
    an inlet connectable to the fuel supply and in fluid communication with the receptacle;
    a outlet in fluid communication with the receptacle;
    a pressure regulator mounted in the receptacle to selectively open fluid communication between the inlet and the outlet, the pressure regulator extending into the void between the first surface of the receptacle and the second surface of the receptacle, the pressure regulator including:
    a third surface surrounding the axis; and
    a fourth surface surrounding the axis and the third surface;
    a first seal engaging the first surface of the receptacle and the third surface of the pressure regulator; and
    a second seal engaging the second surface of the receptacle and the fourth surface of the pressure regulator.

2. The pressure regulation assembly according to claim 1, wherein the pressure regulator further comprises a recess;
    the receptacle further includes a projection extending along the axis and into the recess; and
    the outlet extends through the projection.

3. The pressure regulation assembly according to claim 2, wherein the pressure regulator further comprises a base including:
    the recess; and
    a face extending radially relative to the axis and including a fuel inlet in fluid communication with the inlet; and
    the first seal being intermediate the second seal and the radial face along the axis.

4. The pressure regulation assembly according to claim 1, wherein the third surface of the pressure regulator includes a retainer extending toward the axis; and
    the first seal is located adjacent the retainer.

5. The pressure regulation assembly according to claim 4, wherein the retainer comprises an annular step in the third surface of the pressure regulator.

6. The pressure regulation assembly according to claim 5, wherein the pressure regulator further includes an annular step on the fourth surface extending away from the axis; and
    the second seal is located adjacent the annular step.

7. The pressure regulation assembly according to claim 5, wherein the receptacle further includes:
    a base; and
    a seal seat extending from the first surface of the receptacle and adjacent the base; and
    the first seal is intermediate the seal seat and the retainer.

8. The pressure regulation assembly according to claim 6, wherein the seal seat comprises a plurality of blocks spaced about the perimeter of the first surface of the receptacle.

9. The pressure regulation assembly according to claim 1, wherein the outlet has a constant diameter along the axis sized to minimize noise as fuel passes through the outlet.

10. The pressure regulation assembly according to claim 1, wherein the outlet has a diameter that varies along the axis to minimize noise as fuel passes through the outlet.

11. The pressure regulation assembly according to claim 10, wherein the diameter of the outlet decreases in discrete steps along the axis in a direction away from the pressure regulator.

12. A pressure regulator comprising:
    a first housing member;
    a second housing member connected to the first housing member and including a continuous wall having:
    a base;
    a recess in the base and having
        a first surface surrounding an axis; and
        an inner sealing portion on the first surface;
    an opening in the recess;
    a seat adjacent the opening and surrounding the opening; and
    a second surface surrounding the axis and the first surface and having an outer
    sealing portion; and
    a closing member movably contained within the first housing member and the second housing member and selectively engageable with the seat to fluidly seal the opening.

13. The pressure regulator according to claim 12, further comprising:
    a diaphragm assembly connected between the first housing member and the second housing member and including the closing member; and
    a fuel pressure chamber housed by the diaphragm assembly and the second housing member; and
    the second housing further including:
    a cylindrical housing;
    the base including an annular wall portion encircling the recess and a radial wall portion connecting the first surface and the second surface; and
    a fuel inlet extending through the radial face and in fluid communication with the fuel pressure chamber.

14. The pressure regulator according to claim 13, wherein the inner sealing portion is intermediate the outer seal portion and the radial face along the axis.

15. The pressure regulator according to claim 14, wherein the base includes an annular step radially spaced from the opening and adjacent the inner seal portion for retaining a seal.

16. The pressure regulator according to claim 15, wherein the second housing member comprises a stamped metal housing.

17. The pressure regulator according to claim 16, wherein the seat comprises a coined seat complimentary in shape to the valve closing member.

18. The fuel pressure regulator of claim 12 further comprising:
    a diaphragm assembly movably connected between the first housing and the second housing to divide the pressure chamber into two chamber portions.

19. The fuel pressure regulator according to claim 18, wherein the closing member comprises a spherical body.

20. The fuel pressure regulator according to claim 19, wherein the seat comprises a coined seat shaped complimentary to the spherical body.

21. A modular fuel pressure regulation assembly comprising:

a receptacle defining a first volume, the receptacle including:

first passage in fluid communication with the receptacle; and a second passage in fluid communication with the receptacle and configured to minimize noise as fuel passes through the outlet; and a fuel pressure regulator sealingly mounted within the first volume of the receptacle intermediate the first and second passages to selectively open and close fluid communication between the first and second passages, the fuel pressure regulator including:

an upper housing; and a stamped metal lower housing connected to the upper housing and having:

a base having an orifice and a seat surrounding the orifice; and a side wall portion continuous with the base and defining a second volume surrounding a portion of the second passage to receive the portion of the second passage.

22. The modular fuel pressure regulation assembly according to claim 21, wherein the second passage comprises a passage having one of a generally constant bore opening configuration and a stepped bore opening configuration.

* * * * *